(12) United States Patent
Matsumoto et al.

(10) Patent No.: US 10,883,835 B2
(45) Date of Patent: Jan. 5, 2021

(54) MAP ERROR DETECTION SYSTEM, MAP ERROR DETECTION METHOD, AND PROGRAM

(71) Applicant: MITSUBISHI HEAVY INDUSTRIES MECHATRONICS SYSTEMS, LTD., Kobe (JP)

(72) Inventors: Tomohiro Matsumoto, Tokyo (JP); Kiichi Sugimoto, Tokyo (JP); Takeshi Korenaga, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 533 days.

(21) Appl. No.: 15/554,156

(22) PCT Filed: Mar. 2, 2016

(86) PCT No.: PCT/JP2016/056427
§ 371 (c)(1),
(2) Date: Aug. 28, 2017

(87) PCT Pub. No.: WO2016/140268
PCT Pub. Date: Sep. 9, 2016

(65) Prior Publication Data
US 2018/0058860 A1    Mar. 1, 2018

(30) Foreign Application Priority Data
Mar. 4, 2015 (JP) .................. 2015-042515

(51) Int. Cl.
*G01C 21/30* (2006.01)
*G09B 29/00* (2006.01)
(Continued)

(52) U.S. Cl.
CPC ........... *G01C 21/30* (2013.01); *G08G 1/0112* (2013.01); *G08G 1/0129* (2013.01);
(Continued)

(58) Field of Classification Search
CPC ........ G01C 21/26; G01C 21/30; G01C 21/00; G01C 21/005; G01C 21/06; G01C 21/10;
(Continued)

(56) References Cited

FOREIGN PATENT DOCUMENTS

JP    2014-052341 A    3/2014
JP    2014-160064 A    9/2014
(Continued)

OTHER PUBLICATIONS

PCT/ISA/210, "International Search Report for International Application No. PCT/JP2016/056427," dated May 31, 2016.
(Continued)

*Primary Examiner* — Anthony R Jimenez
(74) *Attorney, Agent, or Firm* — Kanesaka Berner and Partners LLP

(57) ABSTRACT

A map error detection system includes a map error position candidate calculation unit configured to calculate a map error candidate position which is a candidate for route information not included in map information on the basis of an aggregation of positional information not corresponding to route information included in the map information among time-series positional information of a moving object.

20 Claims, 11 Drawing Sheets

(51) Int. Cl.
*G08G 1/056* (2006.01)
*G08G 1/01* (2006.01)
*G09B 29/10* (2006.01)
*G08G 1/123* (2006.01)
*G06F 16/28* (2019.01)
*G01C 21/26* (2006.01)

(52) U.S. Cl.
CPC ............ *G08G 1/0141* (2013.01); *G08G 1/056* (2013.01); *G08G 1/123* (2013.01); *G09B 29/00* (2013.01); *G09B 29/003* (2013.01); *G09B 29/106* (2013.01); *G01C 21/26* (2013.01); *G06F 16/285* (2019.01)

(58) Field of Classification Search
CPC ........ G01C 21/12; G01C 21/14; G01C 21/16; G01C 21/20; G01C 21/34; G01C 21/3415; G01C 21/3492; G01C 21/3446; G01C 21/3691; G01C 21/3694; G06F 16/285; G06F 15/30598; G06F 15/17381; G06F 16/28; G09B 29/00; G09B 29/003; G09B 29/106; G09B 29/10; G08G 1/0112; G08G 1/0129; G08G 1/0141; G08G 1/056; G08G 1/123; G08G 1/00; G08G 1/01; B60W 20/00; B60W 20/12; B60W 30/00; B60W 30/02; B60W 30/10; B60W 30/12; B60W 30/14; G01P 13/00; H04L 47/54; H04L 47/125
USPC ........................................................ 701/473
See application file for complete search history.

(56) References Cited

FOREIGN PATENT DOCUMENTS

| | | |
|---|---|---|
| WO | 2011/023247 A1 | 3/2011 |
| WO | 2012/104965 A1 | 8/2012 |

OTHER PUBLICATIONS

PCT/ISA/237 "Written Opinion of the International Searching Authority for International Application No. PCT/JP2016/056427," dated May 31, 2016.

PCT/ISA/210, "International Search Report for International Application No. PCT/JP2016/056427," dated May 13, 2016.

PCT/ISA/237 "Written Opinion of the International Searching Authority for International Application No. PCT/JP2016/056427," dated May 13, 2016.

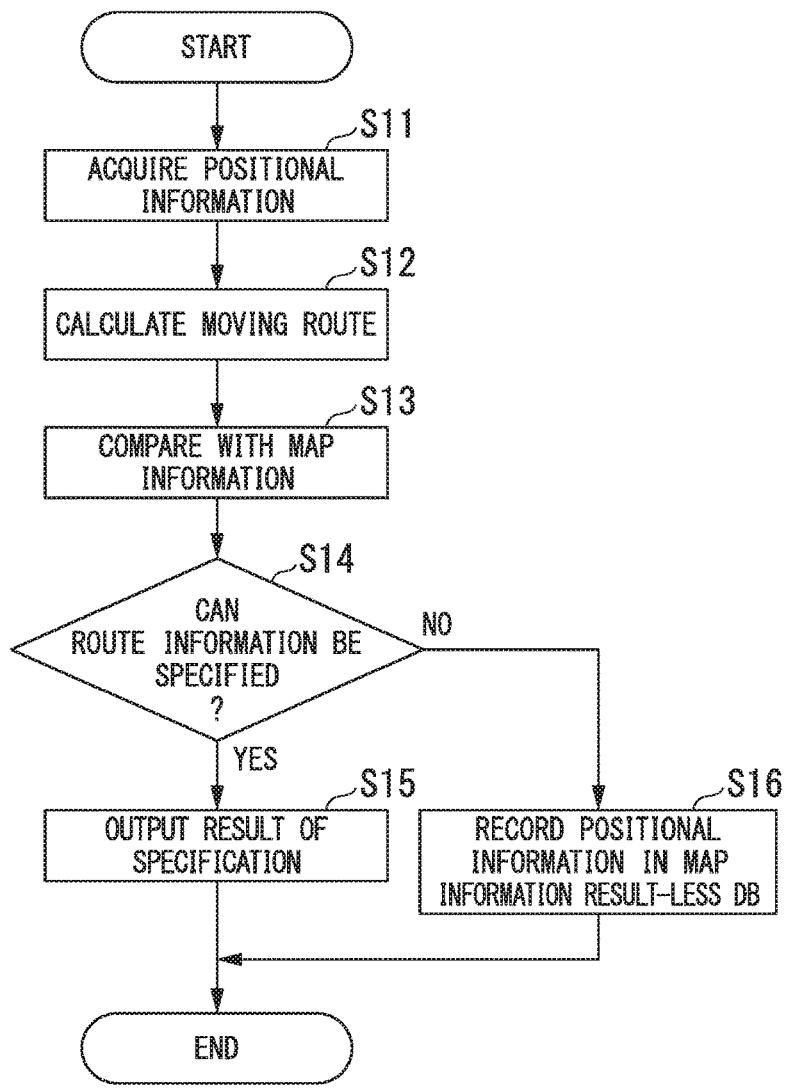

MAP ERROR DETECTION SYSTEM, MAP ERROR DETECTION METHOD, AND PROGRAM

TECHNICAL FIELD

The present invention relates to a map error detection system, a map error detection method, and a program.

This application claims priority based on Japanese Patent Application No. 2015-042515 filed in Japan on Mar. 4, 2015, the entire content of which is incorporated herein by reference.

BACKGROUND ART

When a position of a moving object such as a vehicle, a pedestrian, or the like is positioned, it is necessary to specify a route along which the moving object has moved (map matching) by collating positional information such as a result of GPS measurement of the moving object with map information. When the map matching is performed, a moving route of the moving object is specified using time-series positional information.

For example, Patent Literature 1 describes a road map generation device which calculates an approximate line of a route along which a moving object has moved on the basis of positional information of the moving object, corrects the approximate line to be suitable for a design specification of a road, and generates a road map in which a route indicated by the corrected approximate line is set as a road.

CITATION LIST

Patent Literature

[Patent Literature 1]
Japanese Unexamined Patent Application, First Publication No. 2014-160064

SUMMARY OF INVENTION

Technical Problem

In implementation of the map matching, when time-series positional information shows a behavior of reversely traveling on a one-way traffic road registered in map information, incorrect matching is prevented by not allowing such a moving route. However, when a moving route of a moving object is different from the map information, the map information may be incorrect in some cases. Examples in which the map information is incorrect may include a case in which a traffic direction of one-way traffic is reversed, a case in which a road actually present is not shown in the map information, and the like. Conventionally, errors in map information have been found by test traveling on a road and checking a place with a lot of erroneous detection with the human eye. However, it is not easy to find all errors in such a method since it is haphazard, and labor intensive.

An object of the present invention is to provide a map error detection system, a map error detection method, and a program which can solve the above problems.

Solution to Problem

According to a first aspect of the present invention, a map error detection system includes a map error position candidate calculation unit configured to calculate a map error candidate position which is a candidate for route information not included in map information on the basis of an aggregation of positional information not corresponding to route information included in the map information among time-series positional information of a moving object.

According to a second aspect of the present invention, the map error position candidate calculation unit may calculate the map error candidate position in accordance with a density of distribution of the positional information not corresponding to the route information included in the map information.

According to a third aspect of the present invention, the map error detection system further includes a one-way traffic error determination unit configured to determine whether route information of one-way traffic is included in information on a route existing in the vicinity of the map error candidate position included in the map information.

According to a fourth aspect of the present invention, the map error detection system further includes a one-way traffic automatic determination unit configured to specify neighboring route information with an erroneous traffic direction of one-way traffic among one or a plurality of pieces of information on neighboring routes existing in the vicinity of the map error candidate position included in the map information on the basis of the one or a plurality of pieces of information on neighboring routes and the time-series positional information of the moving object.

According to a fifth aspect of the present invention, the one-way traffic automatic determination unit may reverse the traffic direction of the neighboring route information and, when the reversed traffic direction coincides with a moving direction of a moving object indicated by the times series positional information and a distance between the information on a neighboring route existing closest to a moving route based on the time-series positional information of the moving object and the moving route is within a predetermined threshold value, determine the information on the neighboring route as the neighboring route information with an erroneous traffic direction of one-way traffic.

According to a sixth aspect of the present invention, the one-way traffic automatic determination unit may correct a traffic direction of neighboring route information whose traffic direction is determined to be erroneous.

According to a seventh aspect of the present invention, a map error detection system includes a moving route calculation unit configured to calculate a moving route of a moving object by acquiring time-series positional information of the moving object, a route information specification unit configured to compare the calculated moving route with map information and to specify information on a route corresponding to the calculated moving route among route information included in map information, and a map error position candidate calculation unit configured to calculate a position which is a candidate for route information not included in the map information on the basis of an aggregation of the time-series positional information of the moving object in which route information is unable to be specified when the route information is unable to be specified.

According to an eighth aspect of the present invention, a map error detection method includes calculating a map error candidate position which is a candidate for route information not included in map information on the basis of an aggregation of positional information not corresponding to route information included in the map information among time-series positional information of a moving object.

According to a ninth aspect of the present invention, a program causes a computer of a map error detection system to function as means for calculating a map error candidate position which is a candidate for route information not included in map information on the basis of an aggregation of positional information not corresponding to route information included in the map information among time-series positional information of a moving object.

Advantageous Effects of Invention

According to the map error detection system, the map error detection method, and the program, it is possible to improve efficiency and accuracy of map information error detection.

BRIEF DESCRIPTION OF DRAWINGS

FIG. 2 is a first diagram which shows an example of the process flow of the map error detection system according to the first embodiment of the present invention.

FIG. 3 is a diagram which shows an example of map information result-less information according to the first embodiment of the present invention.

DESCRIPTION OF EMBODIMENTS

First Embodiment

Hereinafter, a map error detection system according to a first embodiment of the present invention will be described with reference to FIGS. 1 to 5.

Figure 1:
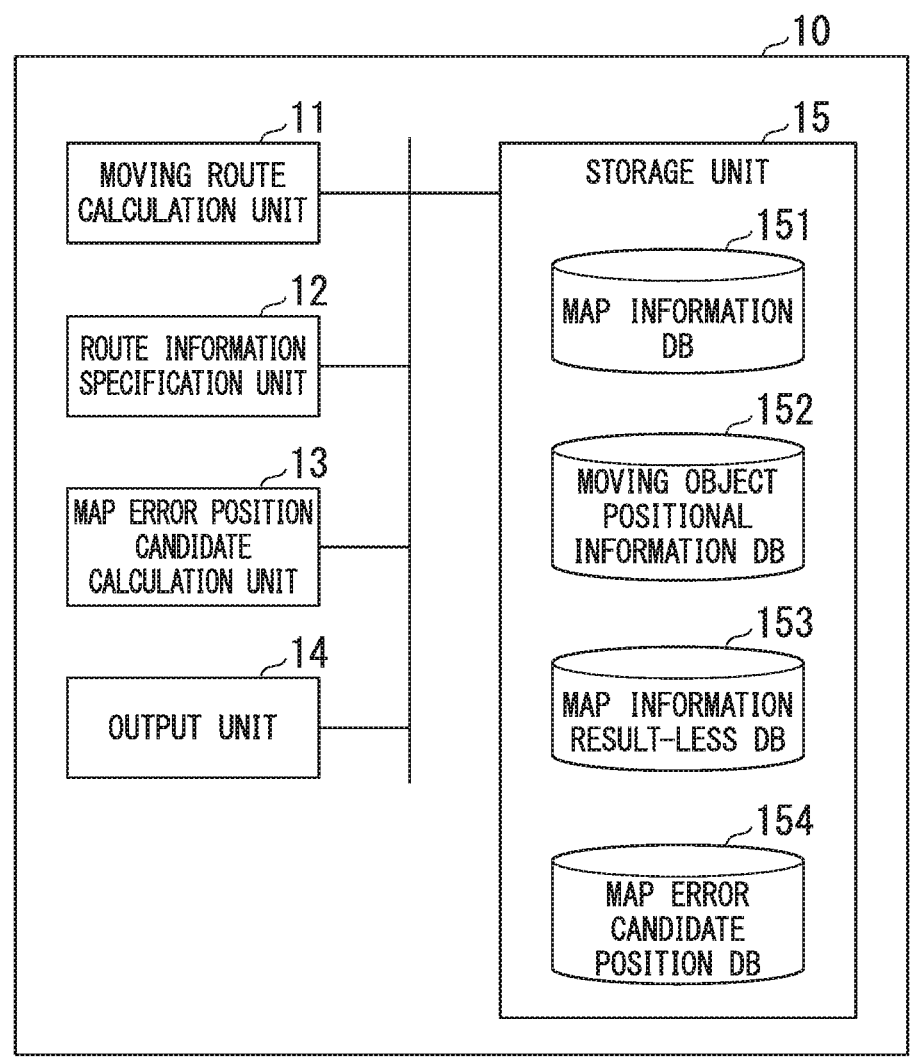
FIG. 1 is a block diagram of a map error detection system according to a first embodiment of the present invention.

FIG. 1 is a block diagram of the map error detection system according to the first embodiment of the present invention A map error detection system 10 is configured from, for example, one or a plurality of server devices. Alternatively, the map error detection system 10 may be configured from, for example, one or a plurality of server devices and one or a plurality of storage devices. FIG. 1 is a block diagram when the map error detection system 10 is configured from, for example, one server device.

The map error detection system 10 is a system which detects, in route information included in the map information, a possibility that map information is erroneous and not like a real world route. The route information is, for example, road information described in the map information. Examples of map errors include cases in which a road actually existing is not reflected on a map, one-way traffic is in a reverse direction, and two-way traffic is erroneously described as one-way traffic.

As shown in FIG. 1, the map error detection system 10 includes a moving route calculation unit 11, a route information specification unit 12, a map error position candidate calculation unit 13, an output unit 14, and a storage unit 15.

The moving route calculation unit 11 acquires time-series positional information of a moving object, and calculates a moving route of the moving object. The moving object is, for example, a vehicle.

The route information specification unit 12 compares the moving route of the moving object calculated by the moving route calculation unit 11 with map information, and specifies information on a route corresponding to the moving route of the moving object in route information included in the map information.

The map error position candidate calculation unit 13 calculates a map error candidate position which is a candidate for route information not included in the map information on the basis of an aggregation of time-series positional information of a moving object when the route information specification unit 12 cannot specify information on a route corresponding to a moving route of the moving object.

The output unit 14 outputs the map error candidate position calculated by the map error position candidate calculation unit 13 to a display device and the like connected to the map error detection system 10.

The storage unit 15 stores various types of information necessary for error detection of a map. The storage unit 15 includes a map information database 151 (map information DB 151), a moving object positional information database 152 (moving object positional information DB 152), a map information result-less database 153 (map information result-less DB 153), and a map error candidate position database 154 (map error candidate position DB 154). Map information including the route information is recorded in the map information DB 151. Time-series positional information of a moving object is recorded in the moving object positional information DB 152. Some pieces of positional information of a moving object in which a moving route does not match the route information included in the map information based on those pieces of positional information among the positional information of a moving object are recorded in the map information result-less DB 153. Positional information of a position at which erroneous route information may be included is recorded in the map error candidate position DB 154.

FIG. 2 is a first diagram which shows an example of the process flow of the map error detection system according to the first embodiment of the present invention.

A process of a preparation stage in which the map error detection system 10 detects a map error candidate position will be described with reference to FIG. 2. The map error detection system 10 in the preparation stage detects positional information of a moving route different from the route information included in the map information among moving routes based on the positional information of a moving object, and accumulates positional information constituting the moving route in the map information result-less DB 153.

First, the moving route calculation unit 11 reads and acquires a certain piece of positional information of a "moving object A" from the moving object positional information DB 152 (step S11). The positional information of a moving object itself positioned during a movement by a global positioning system (GPS) included in the moving object and an inertial measurement unit (IMU) is recorded in the moving object positional information DB 152. For each moving object, identification information of a moving object, positional information of the moving object, and information on time at which the positional information thereof is positioned and the like are recorded in the moving object positional information DB 152. The moving route calculation unit 11 calculates a route along which a corresponding moving object has moved on the basis of the time-series positional information of each moving object acquired from the moving object positional information DB 152 (step S12). For example, the moving route calculation unit 11 calculates a moving route by connecting pieces of read positional information in an order of time at which each corresponding piece of positional information is positioned. The moving route calculation unit 11 outputs information on the moving route calculated for "moving object A" (a calculated moving route) to the route information specification unit 12.

The route information specification unit 12 compares the route information included in the map information DB 151 with a calculated moving route of each moving object (step S13). For example, the route information specification unit 12 reads information on a route existing in the vicinity of the calculated moving route at times T1 to T2 from the map information DB 151. The route information specification unit 12 performs evaluation of a degree of coincidence between the calculated moving route and each piece of the read route information, for example, on the basis of an average distance L between the two, a traffic direction, and the like. The route information specification unit 12 specifies, for example, information on a route having the shortest average distance L as a route along which a moving object has moved at times T1 to T2. At this time, the route information specification unit 12 regards the calculated moving route as being different from the route information of the map information and determines this as "no result" when a value of the average distance L exceeds a predetermined threshold value. Alternatively, when a moving direction is associated with the route information read from the map information DB 151 (in the case of one-way traffic), the route information specification unit 12 compares the associated moving direction with a moving direction of the moving object at times T1 to T2, and, if these directions do not coincide with each other, the route information specification unit 12 regards the calculated moving route as being different from the route information of the map information, and determines this as "no result". Likewise, the route information specification unit 12 specifies route information for a route along which the moving object A has passed at times other than the times T1 to T2. The route information specification unit 12 specifies a combination of these specified respective pieces of route information as a route along which the moving object A has passed. The route information specification unit 12 compares all of the calculated moving routes acquired from the moving route calculation unit 11 with the route information included in the map information, and specifies route information corresponding to each calculated moving route.

The route information specification unit 12 determines whether route information can be specified for the calculated moving route acquired from the moving route calculation unit 11 (step S14). When route information can be specified (step S14=Yes), the route information specification unit 12 outputs specified route information to the output unit 14 (step S15). The output unit 14 outputs route information of a moving object to a display device. When there is a section in which the route information of "moving object A" cannot be specified (step S14=No), the route information specification unit 12 records positional information of the moving object in the section, a positioning time, and identification information of the moving object in the map information result-less DB 153 (step S16). The map error detection system 10 repeats processes of steps S11 to S16 for other moving objects, and records differences between the positional information of a moving object and the route information of the map information in the map information result-less DB 153.

For the process of this preparation stage, a method of so-called map matching can be applied, but other process methods may also be used if there is a difference between a moving route based on the time-series positional information of a moving object and the route information included in the map information, and the positional information of a position at which the map information is likely to be erroneous can be extracted.

FIG. 3 is a diagram which shows an example of the map information result-less information according to the first embodiment of the present invention.

FIG. 3 shows the map information result-less information included in the map information result-less DB 153.

As shown in FIG. 3, the map information result-less information includes items of at least "moving object ID", "positioning date and time", and "positional information".

"Moving object ID" includes the identification information of a moving object which has a section in which route information cannot be specified. "Positional information" includes positional information of a moving object constituting a section in which route information cannot be specified. "Positioning date and time" includes a time at which positional information in a "positional information" item has been positioned. As described with reference to FIG. 2, the route information specification unit 12 records information exemplified in FIG. 3 in the map information result-less DB 153 for the section in which route information cannot be specified.

The map error detection system 10 extracts an aggregation of positional information in a range in which erroneous route information may be registered in map information by the process of the preparation stage.

As a case in which the positional information of a moving object is different from the route information of the map information, there are two possibilities which are a case in which the cause (error) is in the map information and a case in which the cause is in a vehicle such as a vehicle traveling in a place with no road or reversely traveling in one-way traffic. In the present embodiment, the aim is to specify a map error position candidate when the map information has errors such as these possibilities. In order to specify the map error candidate position, for example, it is possible for a person to detect an error in the map information by investigating a vicinity according to aggregation of the positional information recorded in the map information result-less DB 153. However, such a method is inefficient and impractical. Especially in a place with road congestion and the like, investigation is required throughout a whole area, thereby requiring an enormous amount of labor. In the present embodiment, a system which improves accuracy and efficiency in the detection of map error candidates is provided.

Figure 4:
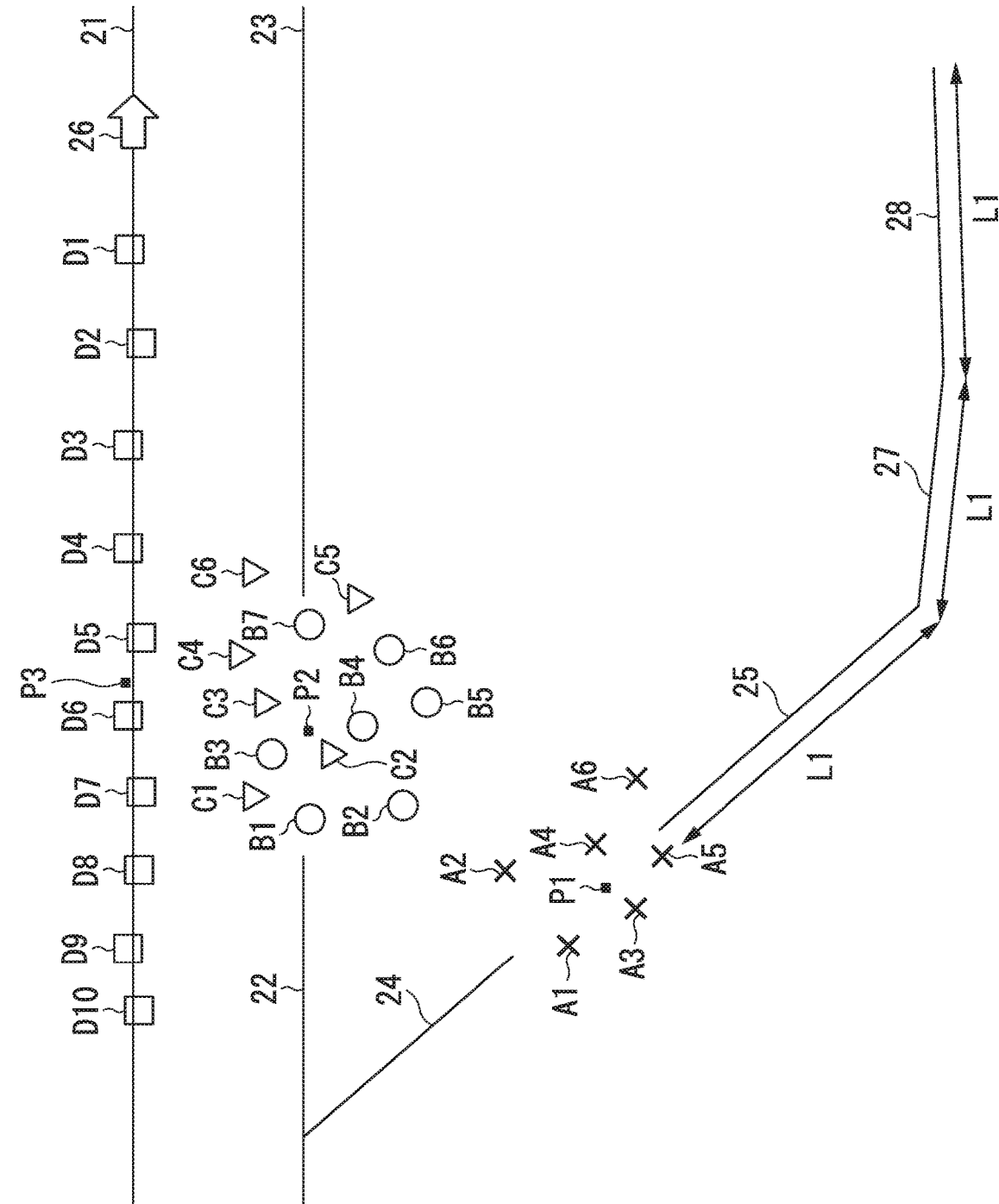
FIG. 4 is a diagram which describes a method of detecting a map error position according to the first embodiment of the present invention.

FIG. 4 is a diagram which describes a method of detecting a map error position according to the first embodiment of the present invention.

FIG. 4 is a diagram which shows an example of a positional relationship between the positional information recorded in the map information result-less DB 153 and the route information included in the map information. Each point of FIG. 4 indicates positional information of a moving object. Positions A1 to A6 are the positional information of a moving object A. The positions A1 to A6 indicate the positional information acquired from the moving object A which has moved in an order of a position A1, a position A2, a position A3, a position A4, a position A5, and a position A6. Positions B1 to B7 are positional information of a moving object B. The positions B1 to B7 indicate the positional information acquired from the moving object B which has moved in an order of a position B1, a position B2, a position B3, a position B4, a position B5, a position B6, and a position B7. Positions C1 to C6 are positional information of a moving object C. The positions C1 to C6 indicate the positional information acquired from the moving object C which has moved in an order of a position C1, a position C2, a position C3, a position C4, a position C5, and a position C6. Positions D1 to D10 are positional information of a moving object D. The positions D1 to D10 indicate the positional information acquired from the moving object D which has moved in an order of a position D1, a position D2, a position D3, a position D4, a position D5, a position D6, a position D7, a position D8, a position D9, and a position D10.

Routes 21 to 25 are route information included in the map information. A route 21 is a one-way traffic route and a traffic direction of the route 21 is set as a direction of an arrow 26. Routes 22 to 25 are two-way roads. A route 22 is not connected to a route 23. A route 24 is not connected to a route 25.

In a case of FIG. 4, the moving object D moves in a reverse direction to the traffic direction of the route 21 indicated in the map information. Accordingly, the route information specification unit 12 cannot find the route information corresponding to the positions D1 to D10 related to the moving object D in the map information in step S13, and the positional information of the positions D1 to D10 is recorded in the map information result-less DB 153. There is no route information at positions of map information corresponding to positions B1 to B7 and the positions C1 to C6. Accordingly, the route information specification unit 12 cannot find the route information corresponding to the positions B1 to B7 related to the moving object B and the positions C1 to C6 related to the moving object C in the map information in step S13, and each piece of positional information for the positions B1 to B7 and the positions C1 to C6 is recorded in the map information result-less DB 153.

An error in the map information is detected using these pieces of positional information recorded in the map information result-less DB 153, but, with respect to all the positional information recorded in the map information result-less DB 153, for example, it is not practical to actually go to a corresponding place and check whether a road exists and whether a direction of one-way traffic is erroneous from the viewpoint of work efficiency. Therefore, in the present embodiment, the map error position candidate calculation unit 13 also performs a process of narrowing down map error candidate positions. Clustering such as MeanShift can be used in the process of narrowing down map error candidate positions. The map error position candidate calculation unit 13 performs clustering using MeanShift to calculate a point at which a distribution density of positional information not in the map information becomes a maximum. According to MeanShift, for example, a circle with a radius R centered on the position B1 is drawn, an average position of points included in the circle among points of the positions A1 to A5, B1 to B7, C1 to C6, and D1 to D10 is calculated, and a circle with a radius R centered on the calculated average position is drawn. Hereinafter, the same operation is repeated, and, when the circle with a radius R does not move anymore and reaches a convergence state, the circle is set as a cluster finding an aggregation of all points included in the circle. The map error position candidate calculation unit 13 performs the same operation with each point set as a starting point for the remaining positions A1 to A5, B2 to B7, C1 to C6, and D1 to D10, and calculates clusters when the positions A1 to A5, B1 to B7, C1 to C6, and D1 to D10 are set as starting points. The map error position candidate calculation unit 13 selects a cluster including the most points (such as the position A1) among the calculated clusters, and determines a center of a circle corresponding to the selected cluster as a map error candidate position. The positions P1, P2, and P3 are examples of the map error candidate position calculated by the map error position candidate calculation unit 13. For example, an average length of a straight line portion (such as L1 in FIG. 4) constituting a road is used as the radius R to secure the accuracy of the map error candidate position.

Figure 5:
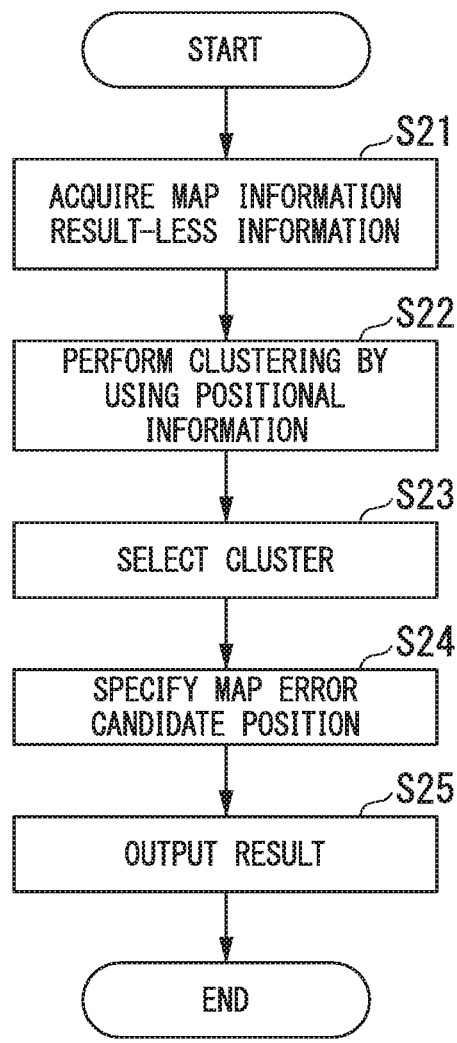
FIG. 5 is a second diagram which shows an example of the process flow of the map error detection system according to the first embodiment of the present invention.

FIG. 5 is a second diagram which shows an example of the process flow of the map error detection system according to the first embodiment of the present invention.

First, the map error position candidate calculation unit 13 reads the map information result-less information obtained by the map matching process and the like from the map information result-less DB 153. Next, the map error position candidate calculation unit 13 performs clustering using positional information (step S22). As a method of clustering, for example, MeanShift as described in FIG. 4 is used. Next, the map error position candidate calculation unit 13 selects a cluster with a high probability of including a map error position candidate among clusters made by clustering (step S23). For example, the map error position candidate calculation unit 13 selects a cluster with the largest number of elements included in a cluster (such as A1 of FIG. 4). Alternatively, the map error position candidate calculation unit 13 may also select a cluster with the number of elements included in a cluster equal to or greater than a predetermined threshold value. Next, the map error position candidate calculation unit 13 specifies a map error candidate position (step S24). For example, the map error position candidate calculation unit 13 may set positional information of a center of a circle corresponding to the cluster selected in step S23 as a map error candidate position. The map error position candidate calculation unit 13 records positional information of the specified map error candidate position in the map error candidate position DB 154. Next, the output unit 14 outputs an image in which the map error candidate position is displayed on the map information to a display device and the like from the map error candidate position DB 154 (step S25). The display device displays an image of the map information in which the map error candidate position is indicated. A worker who performs maintenance of the map information refers to the map error candidate position displayed on the display device, actually goes to the place, and checks whether the map information is erroneous.

According to the present embodiment, it is possible to specify a position with a high probability at which a map error exists, and thus accuracy in detecting a map error position candidate can be improved. Accordingly, the work of detecting a map error position by a worker can be efficiently performed.

Second Embodiment

Hereinafter, a map error detection system according to a second embodiment of the present invention will be described with reference to FIGS. 6 to 8.

Figure 6:
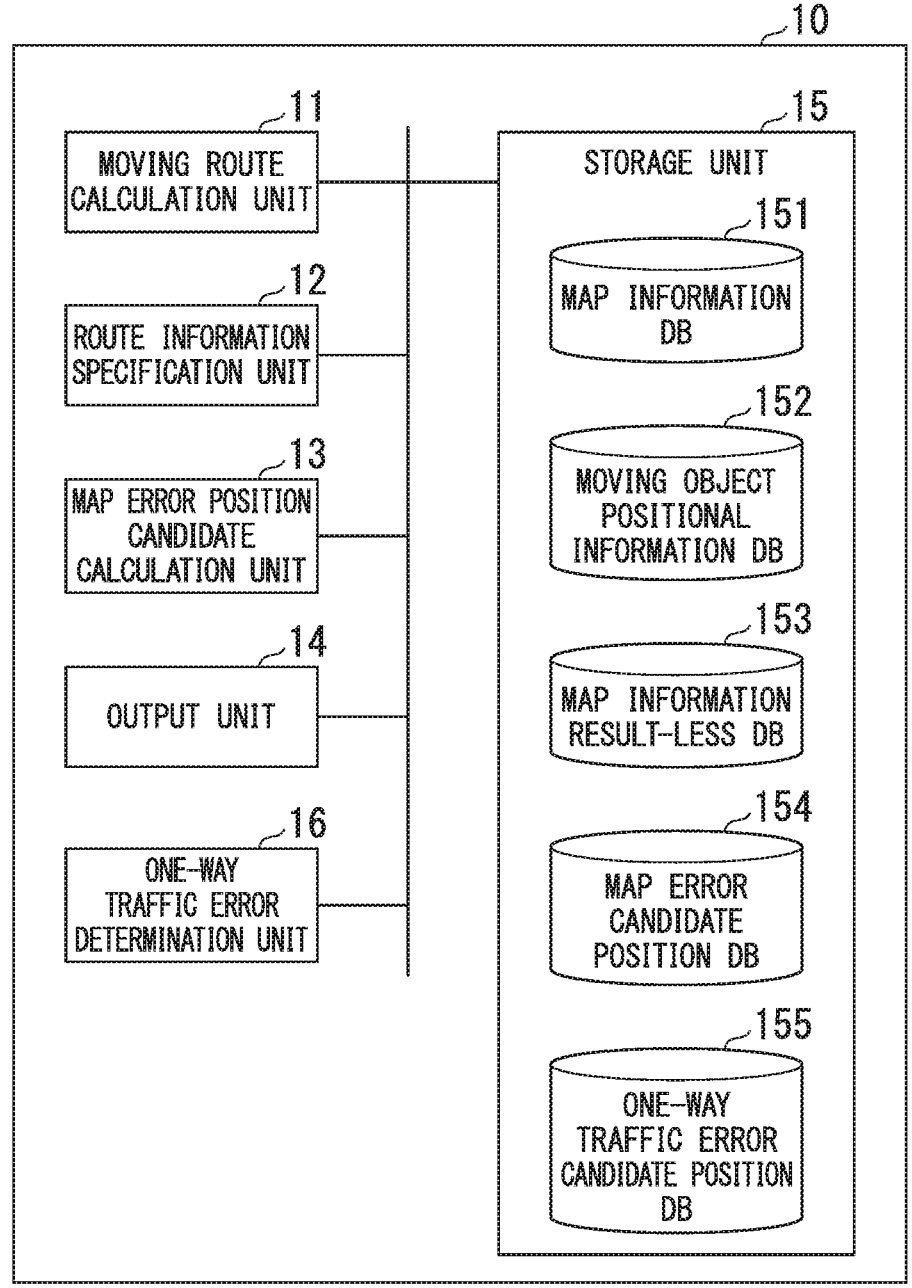
FIG. 6 is a block diagram of a map error detection system according to a second embodiment of the present invention.

FIG. 6 is a block diagram of the map error detection system according to the second embodiment of the present invention.

As shown in FIG. 6, the map error detection system 10 of the present embodiment includes a one-way traffic error determination unit 16. The map error detection system 10 of the present embodiment has a one-way traffic error candidate position DB 155 in a storage unit 15. The one-way traffic error determination unit 16 determines whether route information of one-way traffic is included in information on a route existing in the vicinity of a map error candidate position. When route information of one-way traffic is included in the vicinity of the map error candidate position, the one-way traffic error determination unit 16 records the map error candidate position and positional information of the route information of one-way traffic in the one-way traffic error candidate position DB 155.

Other configurations are the same as in the first embodiment.

Figure 7:
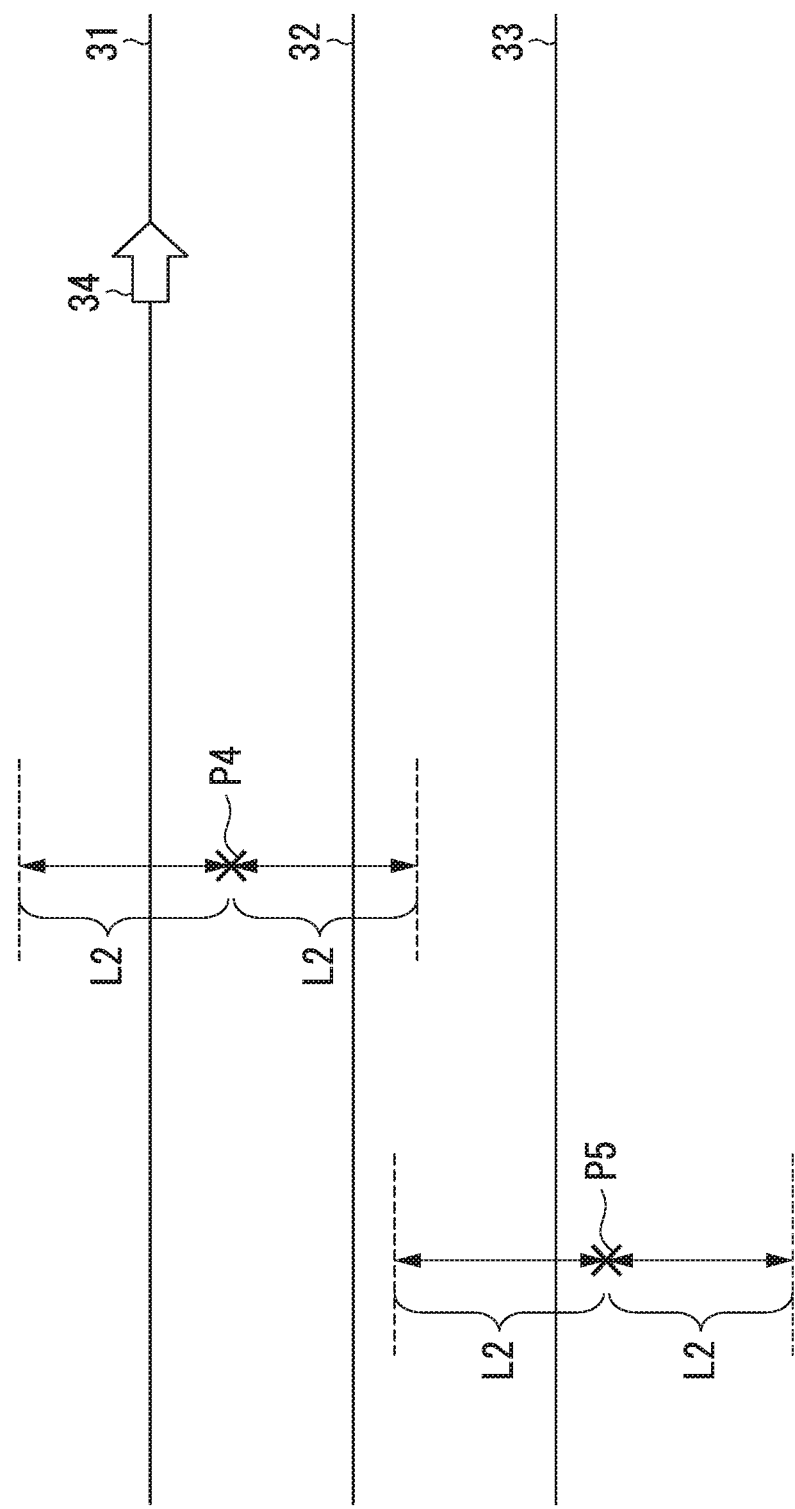
FIG. 7 is a diagram which shows a method of detecting a map error position according to the second embodiment of the present invention.

FIG. 7 is a diagram which describes a method of detecting a map error position according to the second embodiment of the present invention.

A route 31 is a one-way traffic road. A traffic direction of the route 31 is a direction of an arrow 34.

A route 32 and a route 33 are two-way traffic roads. A position P4 and a position P5 are map error candidate positions calculated by the map error position candidate calculation unit 13. The one-way traffic error determination unit 16 determines whether there is route information of one-way traffic in the vicinity of the position P4 with reference to the map information DB 151. For example, the one-way traffic error determination unit 16 detects information on a route existing within a distance L2 from the position P4, and determines whether the route is one-way traffic. In a case of FIG. 7, a route 31 and a route 32 are routes existing within the distance L2 from the position P4. A route 33 is a route existing at a position distant from the position P4 by the distance L2. Among routes existing within the distance L2, the route 31 is a one-way traffic road. The one-way traffic error determination unit 16 determines that there is route information of one-way traffic in the vicinity of the position P4, and records positional information of the position P4 and the positional information of the route 31 in the one-way traffic error candidate position DB 155.

The one-way traffic error determination unit 16 determines whether there is route information of one-way traffic within the distance L2 for a position P5 in the same manner. In a case of the position P5, although a route 33 exists within the distance L2, the route 33 is not a one-way traffic route. The one-way traffic error determination unit 16 determines that there is no one-way traffic route within the distance L2 and records the positional information of the position P5 in the map error candidate position DB 154.

Figure 8:
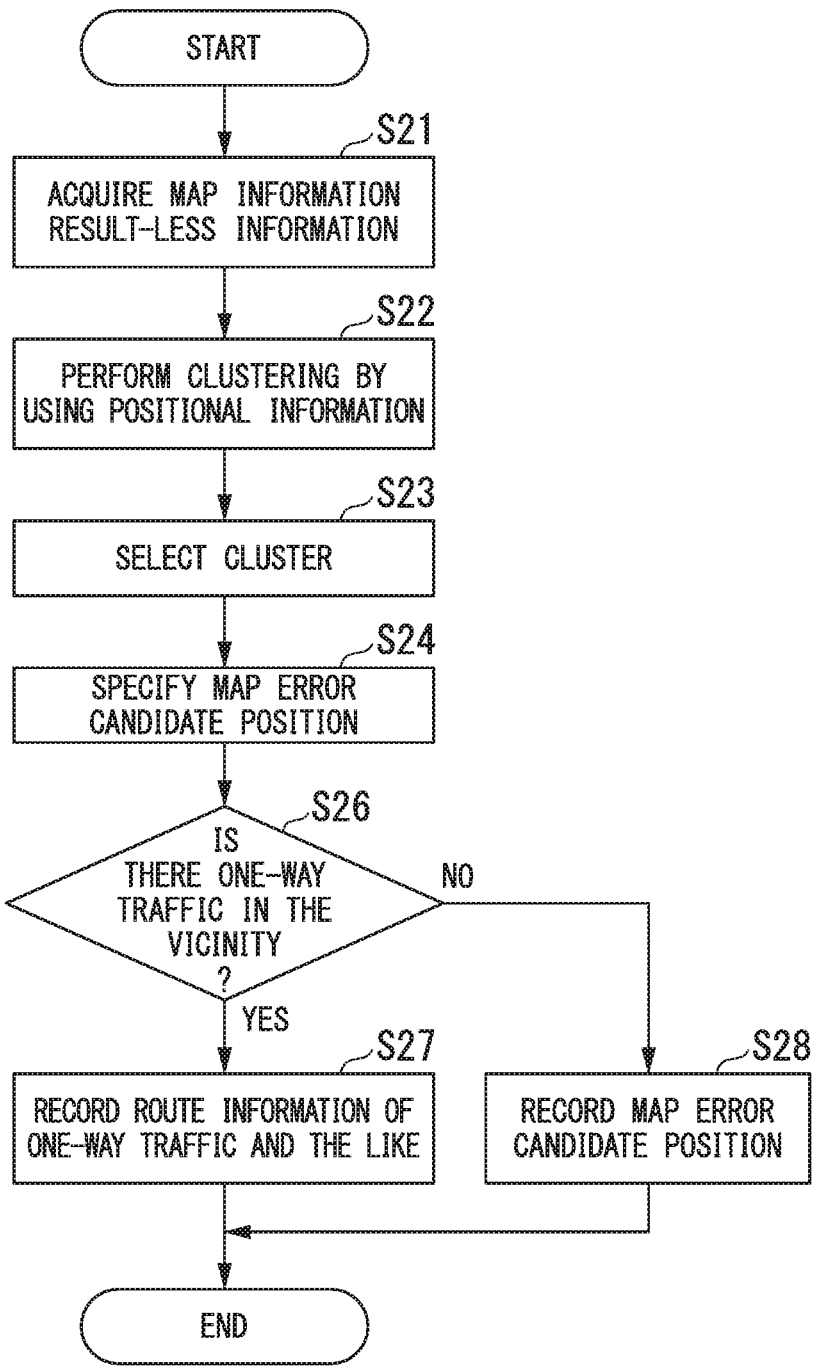
FIG. 8 is a diagram which shows an example of the process flow of the map error detection system according to the second embodiment of the present invention.

FIG. 8 is a diagram which shows an example of the process flow of the map error detection system according to the second embodiment of the present invention.

A process of specifying a map error candidate position in the present embodiment will be described with reference to FIG. 8.

Steps S21 to S24 are the same as in the first embodiment. That is, the map error position candidate calculation unit 13 reads and acquires map information result-less information from the map information result-less DB 153 (step S21), and performs clustering by using these pieces of positional information (step S22). Next, the map error position calculation unit 13 selects a cluster including the map error candidate position from respective clusters generated in step S22 (step S23). Then, the map error position candidate calculation unit 13 specifies a map error candidate position from the selected cluster (step S24). When clustering is performed by MeanShift, the map error candidate position is, for example, a center (convergence point) of the cluster selected in step S23.

The map error position candidate calculation unit 13 outputs the positional information of the specified map error candidate position to the one-way traffic error determination unit 16. The one-way traffic error determination unit 16 reads map information in the vicinity of the positional information acquired from the map error position candidate calculation unit 13 from the map information DB 151. The one-way traffic error determination unit 16 determines whether route information which is one-way traffic is present within a predetermined distance from the map error candidate position (step S26). When there is route information which is one-way traffic (step S26=Yes), the one-way traffic error determination unit 16 records the positional information of the map error candidate position and the positional information of the route information which is one-way traffic existing within the predetermined distance in association with each other in the one-way traffic candidate position DB 155 (step S27). At this time, when there are a plurality of pieces of route information which are one-way traffic within the predetermined distance from the map error candidate position, the one-way traffic error determination unit 16 records positional information of these plurality of pieces of route information in the one-way traffic error candidate position DB 155. A traffic direction in these pieces of route information of one-way traffic does not matter. When there is no route information which is one-way traffic (step S26=No), the one-way traffic error determination unit 16 records the positional information of the map error candidate position in the map error candidate position DB 154 (step S28). The output unit 14 distinguishes and outputs an error candidate position for the traffic direction of one-way traffic and information on a route in the vicinity thereof recorded in the one-way traffic error candidate position DB 155, and the map error candidate position recorded in the map error candidate position DB 154 to a display device and the like. The error candidate position of the traffic direction of one-way traffic (the positional information recorded in the one-way traffic error candidate position DB 155) and a missing road candidate position (the positional information recorded in the map error candidate position DB 154) in the map information are distinguished from each other and displayed on the display device. A worker can distinguish and ascertain an error of the traffic direction of one-way traffic and an error of a missing road candidate position by looking at a display of the display device. An error candidate position of the traffic direction of one-way traffic can be ascertained using route information for one-way traffic existing in the vicinity thereof.

According to the present embodiment, in addition to the effects of the first embodiment, a place of an error in the traffic direction of one-way traffic can be automatically detected, and thus detection of a map error candidate position can be performed in a more efficient and labor-saving manner.

Third Embodiment

Hereinafter, a map error detection system according to a third embodiment of the present invention will be described with reference to FIGS. 9 to 12.

Figure 9:
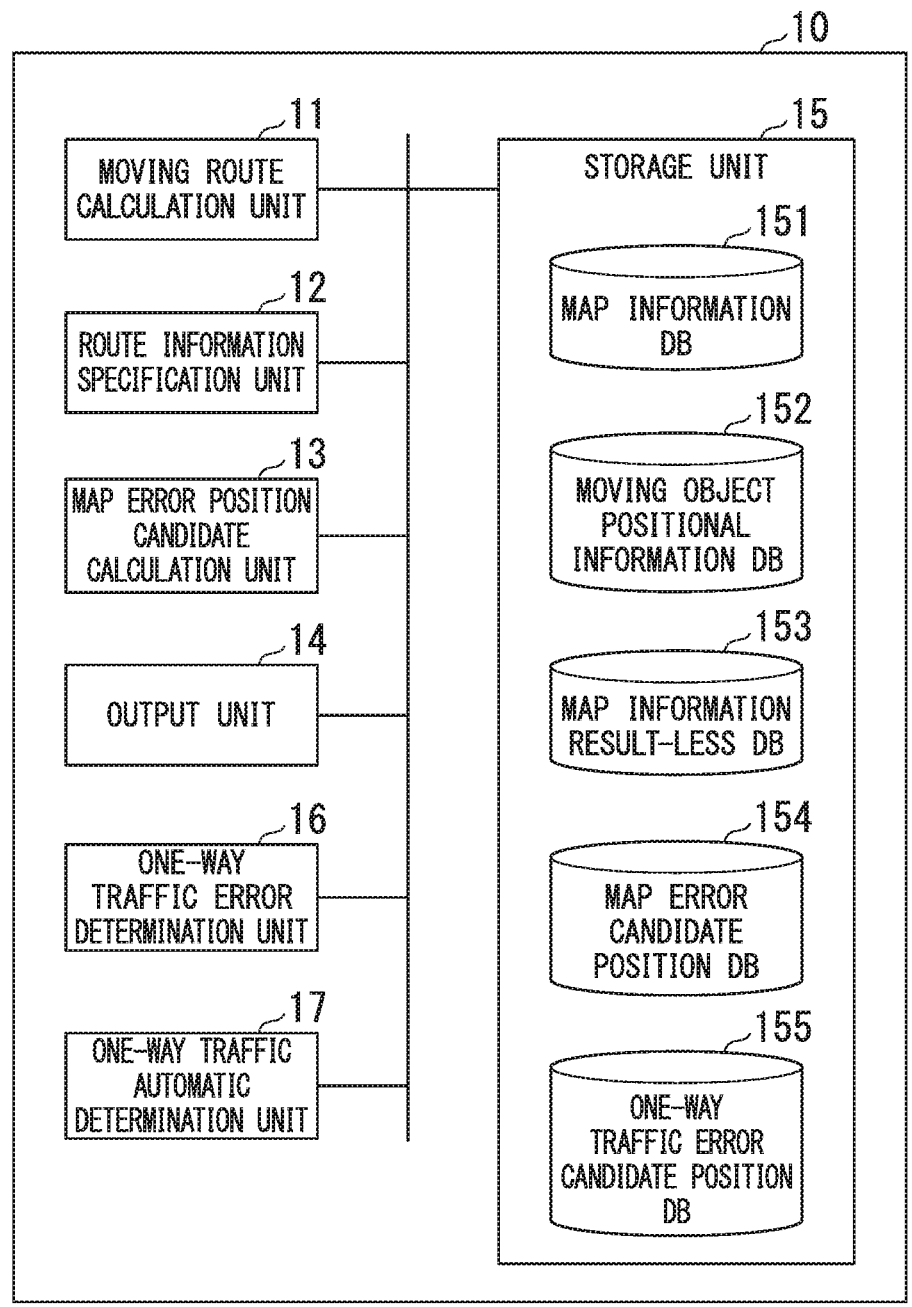
FIG. 9 is a block diagram of a map error detection system according to a third embodiment of the present invention.

FIG. 9 is a block diagram of the map error detection system according to the third embodiment of the present invention.

As shown in FIG. 9, the map error detection system 10 of the present invention includes a one-way traffic automatic determination unit 17. The one-way traffic automatic determination unit 17 specifies route information in which a traffic direction of one-way traffic is reversed on the basis of information on a route existing in the vicinity of the error candidate position included in the map information (neighboring route information) and time-series positional information of a moving object existing within a predetermined range from the neighboring route information. The one-way traffic automatic determination unit 17 corrects the traffic direction of the specified route information included in the map information.

Other configurations are the same as in the second embodiment.

Figure 10:
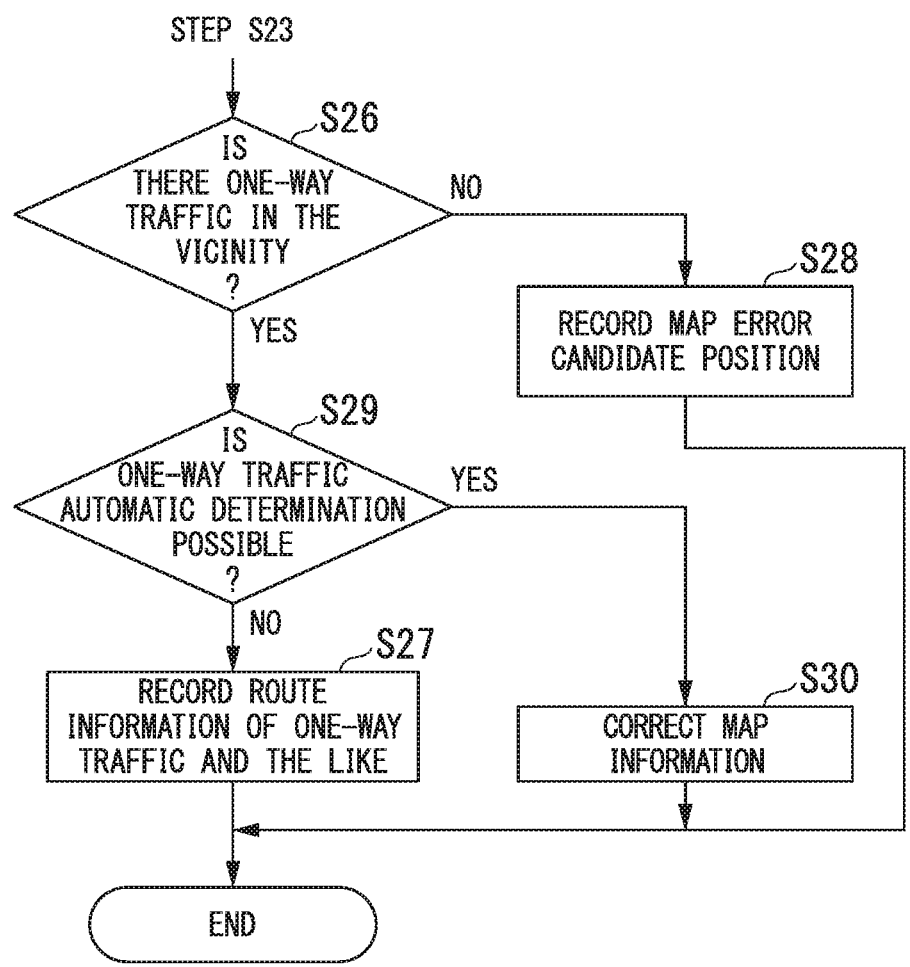
FIG. 10 is a first diagram which shows an example of the process flow of the map error detection system according to the third embodiment of the present invention.

FIG. 10 is a first diagram which shows an example of the process flow of the map error detection system according to the third embodiment of the present invention.

A process of specifying a map error candidate position in the present embodiment will be described with reference to FIG. 10.

Steps S21 to S26 are the same as in the second embodiment, and thus description thereof will be omitted. In a case of the present embodiment, the one-way traffic error determination unit 16 determines whether there is route information which is one-way traffic in the vicinity of a map error candidate position in step S26 (step S26). When there is route information which is one-way traffic (step S26=Yes), the one-way traffic error determination unit 16 outputs positional information of the map error candidate position and positional information of the information on a route in the vicinity of the map error candidate position to the one-way traffic automatic determination unit 17. Next, the one-way traffic automatic determination unit 17 determines whether automatic determination of one-way traffic is possible (step S29). An automatic determination process of one-way traffic refers to a process of determining which pieces of route information which is one-way traffic acquired from the one-way traffic error determination unit 16 have an erroneous traffic direction. This one-way traffic automatic determination process will be described using FIGS. 11 and 12 below. When it is determined that automatic determination of one-way traffic is possible (step S29=Yes), the one-way traffic automatic determination unit 17 corrects map information for a route determined to have an erroneous traffic direction (step S30). When it is determined that automatic determination of one-way traffic is not possible (step S29=No), the one-way traffic automatic determination unit 17 records the positional information of the map error candidate position acquired from the one-way traffic error determination unit 16 and the positional information of the information on a route existing in the vicinity of the map error candidate position in the one-way traffic error candidate position DB 155 (step S27).

When there is no route information which is one-way traffic (step 26=No), the one-way traffic error determination unit 16 records the positional information of the map error candidate position in the map error candidate position DB 154 (step S28).

In the same manner as in the second embodiment, the output unit 14 distinguishes and outputs an error candidate position of the traffic direction of one-way traffic and the route information in the vicinity thereof recorded in the one-way traffic error candidate position DB 155 and the map error candidate position recorded in the map error candidate position DB 154 to a display device and the like.

Figure 11:
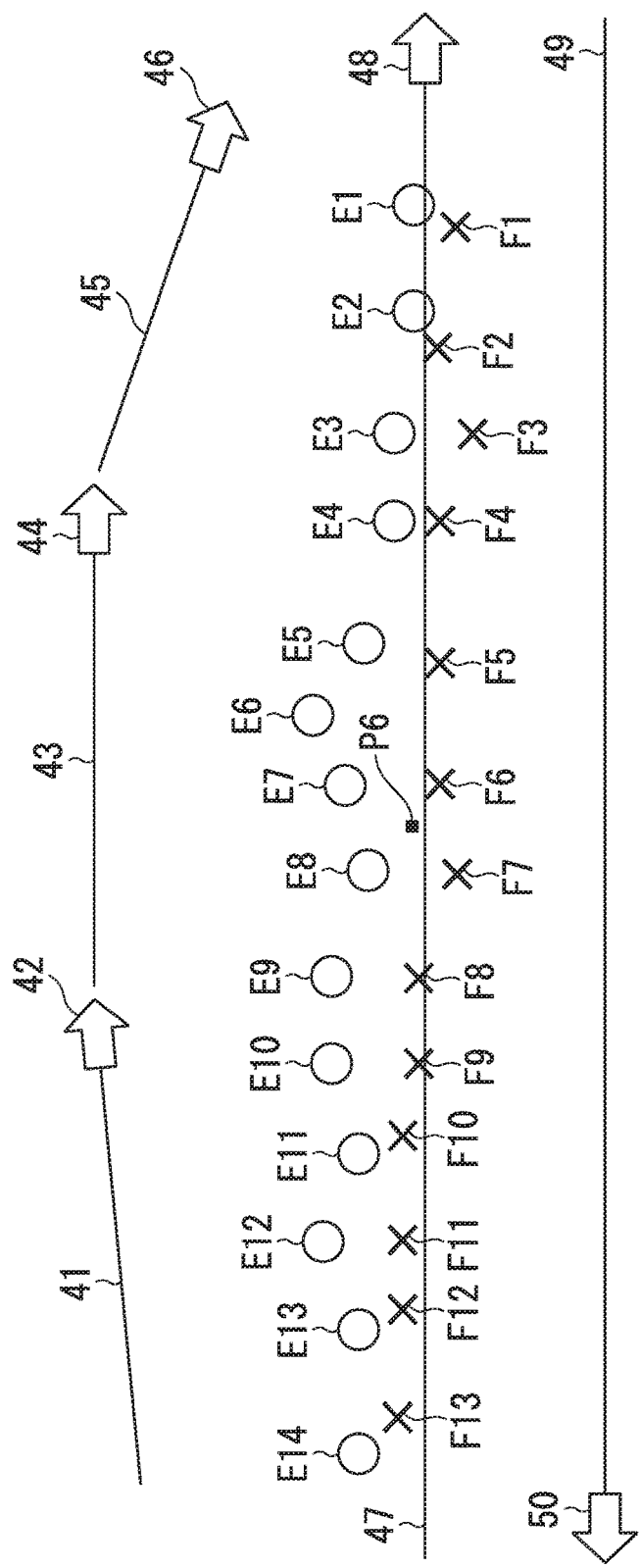
FIG. 11 is a diagram which describes an automatic determination process of one-way traffic according to the third embodiment of the present invention.

FIG. 11 is a diagram which describes an automatic determination process of one-way traffic according to the third embodiment of the present invention.

The automatic determination process of one-way traffic according to the present embodiment will be described using FIG. 11.

A route 41 is a one-way traffic road, and the traffic direction is a direction of an arrow 42. A route 43 is a one-way traffic road, and the traffic direction is a direction of an arrow 44. A route 45 is a one-way traffic road, and the traffic direction is a direction of an arrow 46. A route 47 is a one-way traffic road, and the traffic direction is a direction of an arrow 48. A route 49 is a one-way traffic road, and the traffic direction is a direction of an arrow 50. E1 to E14 and F1 to F13 are time-series positional information of a moving object. FIG. 11 shows that a certain moving object E moves in an order of E1 to E14, and another moving object F moves in an order of F1 to F13. A position P6 is a map error candidate position specified on the basis of the positions E1 to E14 and F1 to F13 of the moving objects by the map error position candidate calculation unit 13. Here, it is assumed that the one-way traffic error determination unit 16 determines that the route 43, the route 47, and the route 49 exist within the distance L2 from the position P6 (step S26).

The one-way traffic automatic determination unit 17 generates route information in which the traffic directions of the route 43, and the route 41 and the route 45 connected to the route 43 in the map information are reversed. In the same manner, the one-way traffic automatic determination unit 17 generates route information in which the traffic direction of the route 47 in the map information is reversed. For example, when the traffic direction is recorded in the storage unit 15 in association with the route 47, the one-way traffic automatic determination unit 17 records information on a direction reverse to the traffic direction in the storage unit 15 in association with the route 47. The one-way traffic automatic determination unit 17 generates route information in which the traffic direction of the route 49 in the map information is reversed. The one-way traffic automatic determination unit 17 determines which route has an erroneous traffic direction on the basis of a result of comparison between the positions E1 to E14 and F1 to F13 and map information including the route information in which traffic directions are reversed.

For example, the one-way traffic automatic determination unit 17 compares a moving direction of a moving object based on the positions E1 to E14 and F1 to F13 with a traffic direction in a plurality of pieces of route information in which traffic directions are reversed, and selects a route in which these directions coincide with each other. The moving direction of the moving object E is a direction from a position E1 to E14. The moving direction of the moving object F is a direction from a position F1 to F13. In a case of FIG. 11, since the reversed traffic direction of the route 49 is opposite to the traffic direction of these moving objects, the route 41, the route 43, the route 45, and the route 47 are selected. The one-way traffic automatic determination unit 17 selects a route with the shortest distance to a moving route calculated based on the positional information of E1 to E14 and F1 to F13 among routes in which the traffic directions coincide with each other. In a case of FIG. 11, the route 47 is selected. The one-way traffic automatic determination unit 17 determines that a selected route has route information in which the traffic direction in the map information is erroneous if a distance between the selected route and a calculated moving route is equal to or less than a predetermined threshold value.

If the one-way traffic automatic determination unit 17 determines that the route 47 has route information in which the traffic direction is erroneous in FIG. 11, the one-way traffic automatic determination unit 17 corrects an error in the map information by reversing the traffic direction of the route 47 in the map information.

Figure 12:
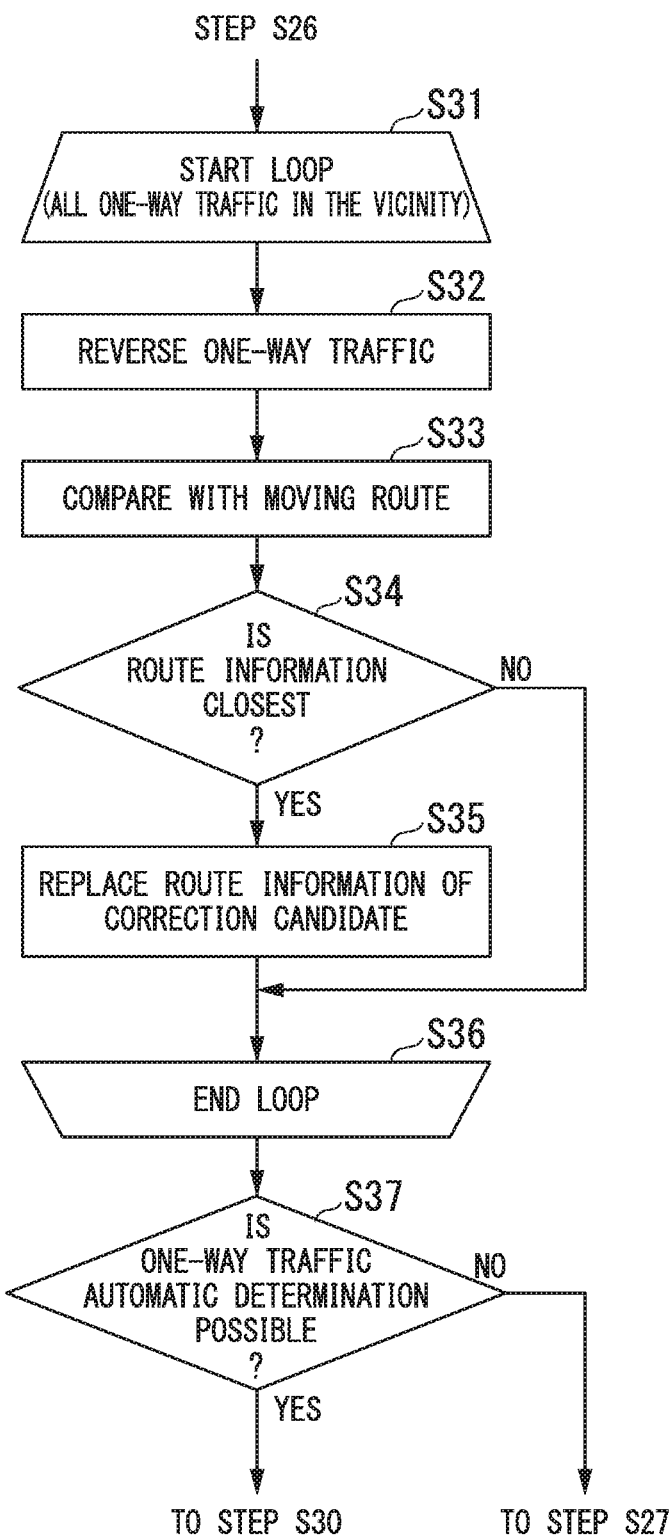
FIG. 12 is a second diagram which shows an example of the process flow of the map error detection system according to the third embodiment of the present invention.

FIG. 12 is a second diagram which shows an example of the process flow of the map error detection system according to the third embodiment of the present invention.

A flow of the automatic determination process of one-way traffic according to the present embodiment will be described with reference to FIG. 12. FIG. 12 is a more detailed process flow than the process of step S29 in FIG. 10.

The one-way traffic automatic determination unit 17 starts a loop process for the information on a route existing in the vicinity of the map error candidate position acquired from the one-way traffic error determination unit 16 (step S31). First, the one-way traffic automatic determination unit 17 selects one piece of the acquired route information (set as route information 100). Next, the one-way traffic automatic determination unit 17 reads map information from the map information DB 151, and reverses the traffic direction of the route information 100 of one-way traffic selected in the map information (step S32). For example, vector information indicating the traffic direction is recorded in association with the route information 100 of one-way traffic, the one-way traffic automatic determination unit 17 generates vector information in a direction reverse to the recorded vector information, and records the vector information in association with the route information 100.

Next, the one-way traffic automatic determination unit 17 instructs the moving route calculation unit 11 to calculate a moving route. The moving route calculation unit 11 reads time-series positional information existing in the vicinity of the route information 100 in which a traffic direction is reversed from the map information result-less DB 153 for each moving object, and calculates moving route information for each moving object. Next, the moving route calculation unit 11 outputs the calculated moving route information (calculated moving route) and a moving direction of a moving object in the moving route information to the route information specification unit 12. The route information specification unit 12 compares the route information 100 included in the map information with the calculated moving route acquired from the moving route calculation unit 11 (step S33). The route information specification unit 12 first compares the reversed traffic direction of the route information 100 with the moving direction of a moving object. When these directions do not coincide with each other, the route information specification unit 12, for example, sets infinity to a score value associated with the calculated moving route. Here, the score is a value indicating a degree of coincidence between the route information included in the map information and the calculated moving route. Here, the smaller the score value, the higher the degree of coincidence. When these directions do not coincide with each other, the comparison between the calculated moving route and the route information 100 ends. The route information specification unit 12 calculates an average distance between the route information 100 with the reversed traffic direction included in the map information and the calculated moving route. The average distance is, for example, an average value of distances from a plurality of points on the route information 100 in which the traffic direction is reversed to a calculated moving route. The route information specification unit 12 sets the calculated average distance value to a score value of the route information 100.

In the same manner, the moving route calculation unit 11 calculates a calculated moving route for positional information of all moving objects, and the route information specification unit 12 obtains a score in accordance with traffic directions or the average distance between each calculated moving route and the route information 100. The route information specification unit 12 obtains an average value of all scores for the route information 100. The route information specification unit 12 outputs the obtained average value to the one-way traffic automatic determination unit 17 as a score for the route information 100.

The one-way traffic automatic determination unit 17 determines whether the route information compared in step S33 (in this case, the route information 100) is closer to a calculated moving route than route information of a correction candidate set in advance (step S34). In this determination, a score of the route information of a correction candidate is compared with a score of the route information compared in step S33 and the one with a smaller value is determined to be closer to the calculated moving route. The route information of a correction candidate is information on a route closest to the calculated moving route among route information compared with the calculated moving route so far. When it is determined that the route information compared in step S33 is closer to the calculated moving route than the route information of a correction candidate (step S34=Yes), the route information of a correction candidate is replaced with the route information compared in step S33 (step S35).

When it is determined that the route information of a correction candidate is closer to the calculated moving route (step S34=No) or when step S35 is completed, the one-way traffic automatic determination unit 17 selects a next single piece (set as route information 101) of the acquired route information, and repeats processes of steps S32 to S35.

The one-way traffic error determination unit 16 ends the loop process if comparison between all the acquired information on routes existing in the vicinity of the map error candidate position acquired from the one-way traffic error determination unit 16 and the route information of a correction candidate ends (step S36). Next, the one-way traffic automatic determination unit 17 determines whether one-way traffic automatic determination is possible (step S37). Specifically, the one-way traffic automatic determination unit 17 makes a determination according to whether a distance between the route information of a correction candidate and the calculated moving route is equal to or less than a predetermined value. Whether a distance between the route information of a correction candidate and the calculated moving route is equal to or less than a predetermined value can be determined based on, for example, whether the score value obtained above is equal to or less than a predetermined value. The one-way traffic automatic determination unit 17 determines that one-way traffic automatic determination is possible if the distance is equal to or less than a predetermined value (step S37=Yes). In this case, the one-way traffic automatic determination unit 17 corrects the map information by reversing the traffic direction of the route information of a correction candidate for the map information (step S30). For example, the one-way traffic automatic determination unit 17 may generate vector information of a direction reverse to a vector recorded in association with the route information of a correction candidate in advance, and update vector information recorded in association with the route information of a correction candidate in advance with the generated vector information. When the distance is greater than the predetermined value, the one-way traffic automatic determination unit 17 determines that one-way traffic automatic determination is not possible. In this case, the one-way traffic automatic determination unit 17 records the positional information of the map error candidate position and the positional information of the information on a route existing in the vicinity of the map error candidate position in the one-way traffic error candidate position DB 155 (step S27).

According to the present embodiment, in addition to the effects of the first embodiment and the second embodiment, a portion of errors in one-way traffic can be automatically determined by one-way traffic automatic determination and a map can be updated, and thus it is possible to simplify a part of map error correction work. A method of making a determination using a score value is described as an example in the comparison with the reversed route information (steps S33 to S34) in FIG. 12, but the present invention is not limited thereto. For example, a determination method used in various types of map matching can be applied.

A procedure of each process in the map error detection system 10 described above is stored in a computer-readable recording medium in a program form, and the process is performed by a computer of the map error detection system 10 reading and executing the program. The computer-readable recording medium herein refers to a magnetic disk, a magneto-optical disk, a CD-ROM, a DVD-ROM, a semiconductor memory, or the like. The computer program may be delivered to the computer by a communication line, and the computer which receives the delivery may execute the program.

The program may be a program for realizing a part of the functions described above. Furthermore, the program may also be a so-called difference file (difference program) which can realize the functions described above by a combination with a program already recorded in a computer system.

The map error detection system 10 may be configured from one computer, or may be configured from a plurality of computers connected to be able to communicate. The map error detection system 10 may be configured from one or a plurality of computers and one or a plurality of storage devices, and the storage device may include the storage unit 15.

In addition, it is possible to replace components in the embodiments described above with well-known components within a scope not departing from the gist of the present invention. The technical scope of the present invention is not limited to the embodiments described above, and various modifications can be made within the scope not departing from the gist of the present invention.

INDUSTRIAL APPLICABILITY

According to the map error detection system, the map error detection method, and the program described above, it is possible to improve the efficiency and accuracy of the map information error detection.

REFERENCE SIGNS LIST

10 Map error detection system
11 Moving route calculation unit
12 Route information specification unit
13 Map error position candidate calculation unit
14 Output unit
15 Storage unit
16 One-way traffic error determination unit
17 One-way traffic automatic determination unit
151 Map information database
152 Moving object positional information database
153 Map information result-less database
154 Map error candidate position database
155 One-way traffic error candidate position database

The invention claimed is:

1. A map error detection system, comprising:
a processor configured to execute instructions for:
  performing clustering utilizing a number of positional information included within a predetermined range for an aggregation of the positional information not corresponding to route information included in map information among time-series positional information of a moving object, determine a point at which a distribution density of the positional information becomes a maximum, and calculate the determined point as a map error candidate position which is a candidate for the route information not included in the map information,
wherein the positional information not corresponding to the route information includes
  the positional information included in moving route information calculated by connecting pieces of the time-series positional information when the moving route information is determined to be different from the route information as a result of comparing the moving route information with the route information, and
  the positional information included in the moving route information when a moving direction indicated by the moving route information is different from a moving direction associated with the route information,
calculating a plurality of clusters in the clustering such that each of the clusters includes a part of the aggregation of the positional information not corresponding to the route information within the predetermined range and each of the clusters includes the part of the aggregation of the positional information that is different from each other, select the cluster including the largest number of the positional information among the calculated clusters, and determine a predetermined point in the selected cluster as the point at which the distribution density of the positional information becomes the maximum.

2. The map error detection system according to claim 1, wherein the processor is configured to execute instructions that specify neighboring route information with an erroneous traffic direction of one-way traffic among one or a plurality of pieces of information on neighboring routes existing in a vicinity of the map error candidate position included in the map information on a basis of the one or a plurality of pieces of information on the neighboring routes and the time-series positional information of the moving object.

3. The map error detection system according to claim 2, wherein the processor is configured to execute instructions that correct a traffic direction of the neighboring route information whose traffic direction is determined to be erroneous.

4. The map error detection system according to claim 2, wherein the processor is configured to execute instructions that reverse a traffic direction of the neighboring route information and, when the reversed traffic direction coincides with a moving direction of the moving object indicated by the time-series positional information and a distance between information on a neighboring route existing closest to a moving route utilizing the time-series positional information of the moving object and the moving route is within a predetermined threshold value, specify the information on the neighboring route as the neighboring route information with the erroneous traffic direction of one-way traffic.

5. The map error detection system according to claim 4, wherein the processor is configured to execute instructions that correct a traffic direction of the neighboring route information whose traffic direction is determined to be erroneous.

6. The map error detection system according to claim 1, wherein the processor is configured to execute instructions that determine whether route information of one-way traffic is included in information on a route existing in a vicinity of the map error candidate position included in the map information.

7. The map error detection system according to claim 6, wherein the processor is configured to execute instructions that specify neighboring route information with an erroneous traffic direction of one-way traffic among one or a plurality of pieces of information on neighboring routes existing in the vicinity of the map error candidate position included in the map information on a basis of the one or a plurality of pieces of information on neighboring routes and the time-series positional information of the moving object.

8. The map error detection system according to claim 7, wherein the processor is configured to execute instructions that reverse a traffic direction of the neighboring route information and, when the reversed traffic direction coincides with a moving direction of a moving object indicated by the times series positional information and a distance between information on a neighboring route existing closest to a moving route utilizing the time-series positional information of the moving object and the moving route is within a predetermined threshold value, specify the information on the neighboring route as the neighboring route information with the erroneous traffic direction of one-way traffic.

9. The map error detection system according to claim 7, wherein the processor is configured to execute instructions that correct a traffic direction of the neighboring route information whose traffic direction is determined to be erroneous.

10. The map error detection system according to claim 1, wherein the clustering is mean shift and the predetermined range in the clustering is a circle with a radius of an average length of a straight line portion constituting a road in the route information, and the circle is centered on one point utilizing the positional information not corresponding to the route information.

11. The map error detection system according to claim 10, wherein the processor is configured to execute instructions that determine whether route information of one-way traffic is included in information on a route existing in a vicinity of the map error candidate position included in the map information.

12. The map error detection system according to claim 11, wherein the processor is configured to execute instructions that specify neighboring route information with an erroneous traffic direction of one-way traffic among one or a plurality of pieces of information on neighboring routes existing in the vicinity of the map error candidate position included in the map information on a basis of the one or a plurality of pieces of information on neighboring routes and the time-series positional information of the moving object.

13. The map error detection system according to claim 12, wherein the processor is configured to execute instructions that reverse a traffic direction of the neighboring route information and, when the reversed traffic direction coincides with a moving direction of a moving object indicated by the time-series positional information and a distance between information on a neighboring route existing closest to a moving route utilizing the time-series positional information of the moving object and the moving route is within a predetermined threshold value, specify the information on the neighboring route as the neighboring route information with the erroneous traffic direction of one-way traffic.

14. The map error detection system according to claim 10, wherein the processor is configured to execute instructions that specify neighboring route information with an erroneous traffic direction of one-way traffic among one or a plurality of pieces of information on neighboring routes existing in a vicinity of the map error candidate position included in the map information on a basis of the one or a plurality of pieces of information on neighboring routes and the time-series positional information of the moving object.

15. The map error detection system according to claim 14, wherein the processor is configured to execute instructions that reverse a traffic direction of the neighboring route information and, when the reversed traffic direction coincides with a moving direction of a moving object indicated by the time-series positional information and a distance between information on a neighboring route existing closest to a moving route utilizing the time-series positional information of the moving object and the moving route is within a predetermined threshold value, specify the information on the neighboring route as the neighboring route information with the erroneous traffic direction of one-way traffic.

16. The map error detection system according to claim 14, wherein the processor is configured to execute instructions that correct a traffic direction of the neighboring route information whose traffic direction is determined to be erroneous.

17. The map error detection system according to claim 12, wherein the processor is configured to execute instructions that correct a traffic direction of the neighboring route information whose traffic direction is determined to be erroneous.

18. A map error detection system, comprising:
a processor configured to execute instructions that
calculate moving route information of a moving object by acquiring time-series positional information of the moving object and connecting pieces of the time-series positional information;
compare the calculated moving route information with map information and to specify route information corresponding to the calculated moving route information among route information included in the map information; and
perform clustering utilizing a number of positional information included within a predetermined range for an aggregation of the time-series positional information of the moving object in which the route information is unable to be specified when the route information is unable to be specified, determine a point at which a distribution density of the positional information becomes a maximum, and calculate the determined point as a map error candidate position which is a candidate for the route information not included in the map information,
wherein the positional information in which the route information is unable to be specified includes
the positional information included in the moving route information when the moving route information is determined to be different from the route information as a result of comparing the moving route information with the route information, and
the positional information included in the moving route information when a moving direction indicated by the moving route information is different from a moving direction associated with the route information,
wherein the processor is configured to execute instructions that calculate a plurality of clusters in the clustering such that each of the clusters includes a part of the aggregation of the positional information in which the route information is unable to be specified within the predetermined range and each of the clusters includes the part of the aggregation of the positional information that is different from each other, select the cluster including the largest number of the positional information among the calculated clusters, and determine a predetermined point in the selected cluster as the point at which the distribution density of the positional information becomes the maximum.

19. A map error detection method, comprising:
a step of performing clustering utilizing a number of positional information included within a predetermined range for an aggregation of the positional information not corresponding to route information included in map information among time-series positional information of a moving object, determining a point at which a distribution density of the positional information becomes a maximum, and calculating the determined point as a map error candidate position which is a candidate for the route information not included in the map information,
wherein the positional information not corresponding to the route information includes
the positional information included in moving route information calculated by connecting pieces of the time-series positional information when the moving route information is determined to be different from the route information as a result of comparing the moving route information with the route information, and
the positional information included in the moving route information when a moving direction indicated by the moving route information is different from a moving direction associated with the route information,
wherein, in the step, calculating a plurality of clusters in the clustering such that each of the clusters includes a part of the aggregation of the positional information not corresponding to the route information within the predetermined range and each of the clusters includes the part of the aggregation of the positional information that is different from each other, selecting the cluster including the largest number of the positional information among the calculated clusters, and determining a predetermined point in the selected cluster as the point at which the distribution density of the positional information becomes the maximum are performed.

20. A non-transitory computer-readable medium that stores a program which causes a computer of a map error detection system to function as means for performing clustering utilizing a number of positional information included within a predetermined range for an aggregation of the positional information not corresponding to route information included in map information among time-series positional information of a moving object, determining a point at which a distribution density of the positional information becomes a maximum, and calculating the determined point as a map error candidate position which is a candidate for the route information not included in the map information,
wherein the positional information not corresponding to the route information includes
the positional information included in moving route information calculated by connecting pieces of the time-series positional information when the moving route information is determined to be different from the route information as a result of comparing the moving route information with the route information, and
the positional information included in the moving route information when a moving direction indicated by the moving route information is different from a moving direction associated with the route information,
wherein the means is configured to calculate a plurality of clusters in the clustering such that each of the clusters includes a part of the aggregation of the positional information not corresponding to the route information within the predetermined range and each of the clusters includes the part of the aggregation of the positional information that is different from each other, select the cluster including the largest number of the positional information among the calculated clusters, and determine a predetermined point in the selected cluster as the point at which the distribution density of the positional information becomes the maximum.

* * * * *